Figure 1:
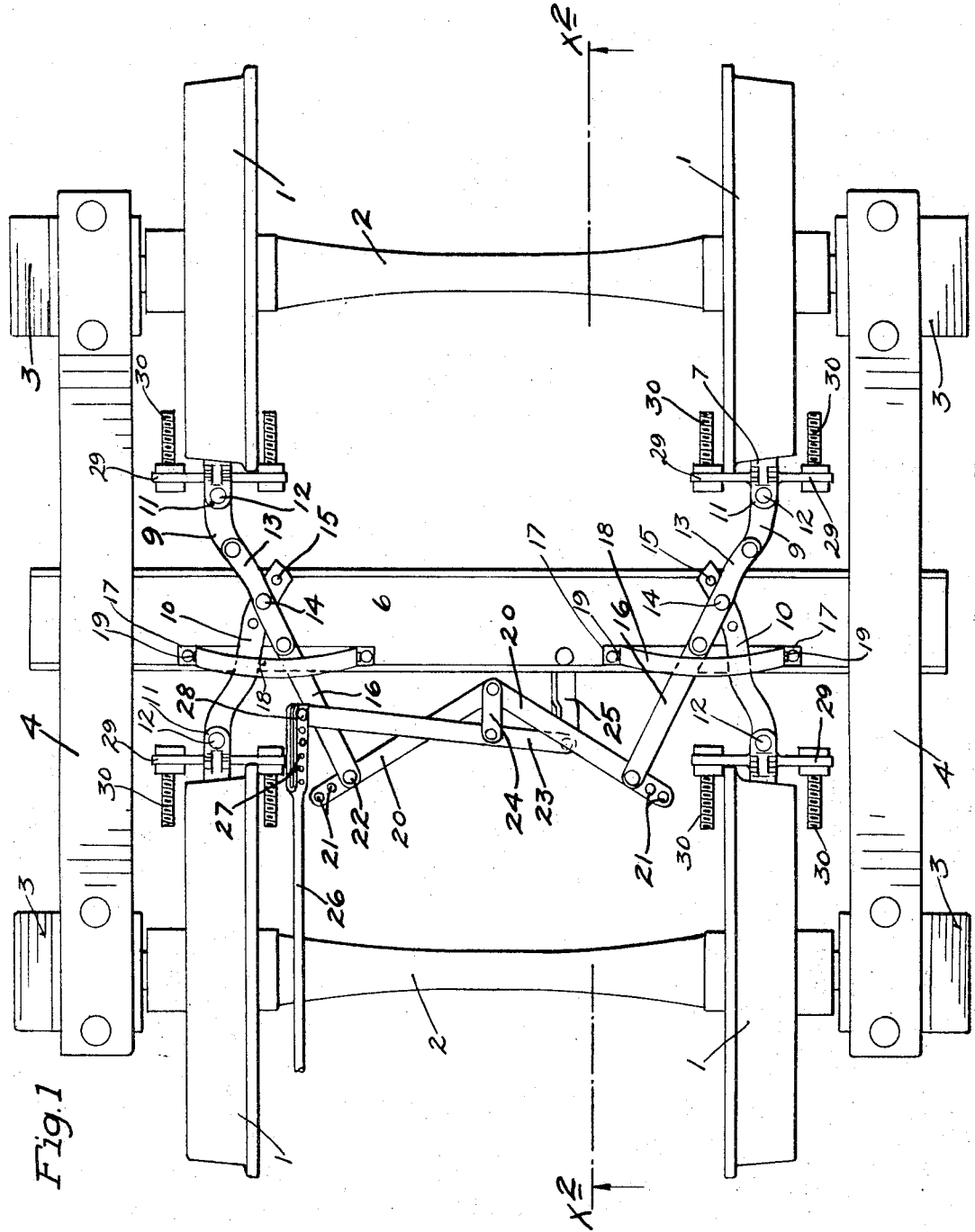

T. PRIEM.
BRAKE ACTUATING MECHANISM.
APPLICATION FILED MAY 4, 1914.

1,116,917.

Patented Nov. 10, 1914.
2 SHEETS—SHEET 1.

WITNESSES
E. C. Skinkle
A. H. Opsahl

INVENTOR
Theodore Priem
BY HIS ATTORNEYS
Williamson Merchant

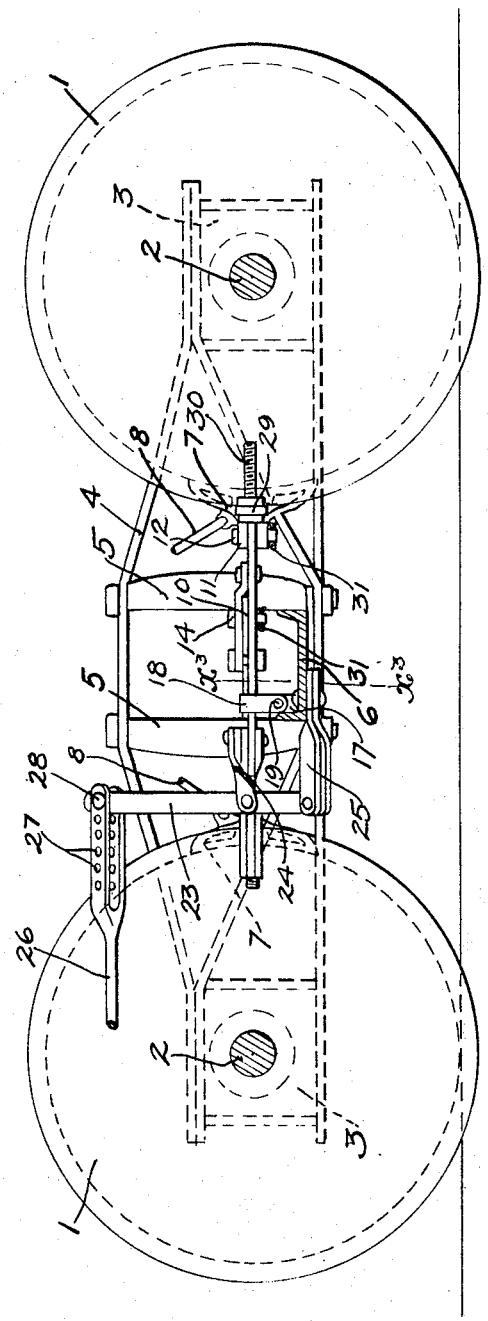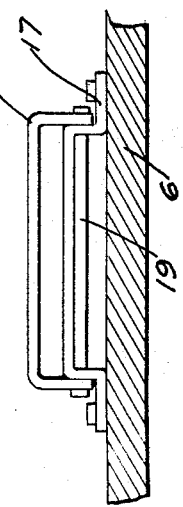

UNITED STATES PATENT OFFICE.

THEODORE PRIEM, OF WEYERHAUSER, WISCONSIN.

BRAKE-ACTUATING MECHANISM.

1,116,917.  Specification of Letters Patent.  Patented Nov. 10, 1914.

Application filed May 4, 1914. Serial No. 836,131.

*To all whom it may concern:*

Be it known that I, THEODORE PRIEM, a citizen of the United States, residing at Weyerhauser, in the county of Rusk and State of Wisconsin, have invented certain new and useful Improvements in Brake-Actuating Mechanism; and I do hereby declare the following to be a full, clear, and exact description of the invention, such as will enable others skilled in the art to which it appertains to make and use the same.

My invention has for its object to provide an extremely simple and highly efficient car brake actuating mechanism, and, to this end, it consists of the novel devices and combinations of devices herein after described and defined in the claims.

In the accompanying drawings, which illustrate the invention, like characters indicate like parts throughout the several views.

Referring to the drawings, Figure 1 is a plan view of a car truck, some parts being removed, and having applied thereto, in working position, the improved brake actuating mechanism; Fig. 2 is a longitudinal vertical section, taken on the line $x^2 x^2$ of Fig. 1; and Fig. 3 is a detail view, partly in elevation and partly in vertical section, taken on the line $x^3 x^3$ of Fig. 2.

Of the parts of the freight car truck illustrated for the purpose of showing the invention applied in working position, it is only necessary to note the wheels 1, axles 2, journal boxes 3, truck side frames 4, bolster columns 5, sand plank 6, and shoe-equipped brake heads 7, suspended in the customary manner from brake hangers 8. The truck bolster and supporting springs are removed in order to more clearly show the invention applied to the truck. All of the parts thus far described may be of the standard or any desired construction.

Referring now in detail to the improved brake actuating mechanism, the numerals 9 and 10 indicate the members of a pair of primary toggles having their outer ends mounted between pairs of vertically spaced lugs 11 on the brake heads 7, and pivotally secured thereto by pins 12. The inner ends of the toggle members 10 work between the toggle members 9 and guide straps 13, rigidly secured thereto. Pivot pins 14, which connect the members of the primary toggles at their joints, are passed through alined perforations in the toggle members 9 and guide straps 13, and through any one of a plurality of longitudinally spaced perforations 13, formed in the inner ends of the primary toggle members 10. This connecting of the members of the primary toggles for longitudinal adjustment permits the mechanism to be readily adjusted for cars of different capacities, wherein the wheels are spaced different distances one ahead of the other.

Each primary toggle member 9 is provided with an arm extension 16. The member 10 and arm extension 16 of each primary toggle work between a base plate 17 and a coöperating yoke-like guide strap 18. As shown, the base plate 17 is secured to the upper face of the sand plank 6 and the ends of the guide straps 18 are pivotally secured to the base plate 17 by a long hinge bolt 19, which permits rocking movement of the guide straps 18 longitudinally of the primary toggles.

From the above description, in connection with the drawings, it is evident that a separating movement of the arm extensions 16 will tend to straighten the primary toggles and thereby separate the respective pairs of brakes carried thereby, and apply the same to the car wheels, which travel one ahead of the other.

To move the arm extension 16, either toward or from each other, to release or set the brakes, I provide a secondary toggle 20. The outer ends of the members of the secondary toggle 20 are mounted between the prongs of the bifurcated ends of the arm extensions 16 and are provided with a plurality of longitudinally spaced perforations 21. Pivot pins 22 pivotally connect the arm extensions 16 with the secondary toggle 20 and are passed through alined perforations in the prongs of the bifurcated ends of the arm extensions 16 and through any one of the perforations 21 in the secondary toggle 20. By adjustably connecting the secondary toggle 20 to the arm extensions 16, said toggle is permitted to be set in its most effective position.

To straighten or buckle the secondary toggle 20, is provided a brake lever 23, intermediately connected to the joint of said secondary toggle by a link 24. The short end of the brake lever 23 is fulcrumed to a relatively fixed bracket 25, rigidly secured to the sand plank 6. To the other or long end of the brake lever 23 is secured one end of a brake rod 26, which may be actuated in any suitable manner, by air or hand, for the purpose of this case it will not be necessary to illustrate. As shown, the end of the brake rods 26 is bifurcated to receive the brake lever 23 and the prongs thereof are provided with a plurality of alined longitudinally spaced perforations 27, through any one pair of which and a perforation in the lever 23 is passed a pivot pin 28. The adjustment between the brake lever and brake rod permits slack to be taken up between said brake lever and the brake rod actuating means.

To keep the brake shoes properly positioned on the tread flanges of the wheels 1, and against lateral movements, the brake shoes 7 are each provided with a pair of oppositely projecting ears or lugs 29, in which are mounted horizontally projecting guide pins 30, arranged to embrace the wheels. All of the pivot pins 12, 14, 22 and 28, are held against removal from the seats in which they are mounted by split keys 31.

By the use of the above described brake actuating mechanism, the customary brake beam, safety hangers for the brake beam, dead lever, dead lever guides, and bottom rod are entirely dispensed with, thereby making an extremely simple mechanism. It is, of course, evident that the elements of the improved brake mechanism may be set in various different positions to fit car trucks of different designs. Obviously, the connections between the various elements of the brake actuating mechanism are such that the pressure on the brake shoes will be equally distributed onto the several car wheels. By pivotally mounting the guides 18, the same will turn to permit free movements of the primary toggle and arm extensions 16 during the setting and releasing of the brakes. The length and position of the brake lever 23 is such as to permit the brake rod 26 to work freely over the bolster of the following truck.

It is also understood that the improved brake actuating mechanism may be attached to brake-shoe-equipped heads of the standard or of any desired construction and, of course, the customary brake hangers may be employed.

What I claim is:

1. In a car truck, the combination with the wheels and shoe-equipped brake heads, of primary toggles connecting said brake heads in pairs on opposite sides of said car truck, one member of each of said primary toggles having an arm extension, a secondary toggle connecting said arm extensions, a brake lever connected to said secondary toggle, and a brake rod connected to said brake lever.

2. In a car truck, the combination with the wheels and shoe-equipped brake heads, of primary toggles connecting said brake heads in pairs on opposite sides of said car truck, one member of each of said primary toggles having an arm extension, a secondary toggle connecting said arm extensions, a brake lever fulcrumed to a relatively fixed part on said car truck, a link pivotally connecting the joint of said secondary toggle to the intermediate portion of said brake lever, and a brake rod connected to the free end of said brake lever.

3. In a car truck, the combination with the wheels and shoe-equipped brake heads, of longitudinally adjustable primary toggles connecting said brake heads in pairs on opposite sides of said car truck, one member of each of said primary toggles having an arm extension, a secondary toggle connecting said arm extensions, a brake lever fulcrumed to a relatively fixed part on said car truck, a link pivotally connecting the joint of said secondary toggle to the intermediate portion of said brake lever, and a brake rod connected to the free end of said brake lever.

4. In a car truck, the combination with the wheels and shoe-equipped brake heads, of longitudinally adjustable primary toggles connecting said brake heads in pairs on opposite sides of said car truck, one member of each of said primary toggles having an arm extension, a longitudinally adjustable secondary toggle connecting said arm extensions, a brake lever fulcrumed to a relatively fixed part on said car truck, a link pivotally connecting the joint of said secondary toggle to the intermediate portion of said brake lever, and a longitudinally adjustable brake rod attached to the free end of said brake lever.

5. In a car truck, the combination with the wheels and shoe-equipped brake heads, of primary toggles connecting said brake heads in pairs on opposite sides of said car truck, one member of each of said primary toggles having an arm extension, guides on a relatively fixed part of said car truck through which said primary toggles and arm extensions work, a secondary toggle connecting said arm extensions, a brake lever connected to said secondary toggle, and a brake rod connected to said brake lever.

In testimony whereof I affix my signature in presence of two witnesses.

THEODORE PRIEM.

Witnesses:
EDW. KOLDROWICZ,
J. M. MCCUMBER.